(12) United States Patent
Kirsch et al.

(10) Patent No.: US 8,675,907 B2
(45) Date of Patent: Mar. 18, 2014

(54) VEHICLE AUDIO SYSTEM HAVING DOOR MOUNTED SPEAKER SUPPORT

(75) Inventors: Matthew R. Kirsch, Shelby Twp., MI (US); Richard A. Close, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 398 days.

(21) Appl. No.: 13/080,220

(22) Filed: Apr. 5, 2011

(65) Prior Publication Data

US 2012/0027222 A1 Feb. 2, 2012

Related U.S. Application Data

(60) Provisional application No. 61/369,305, filed on Jul. 30, 2010.

(51) Int. Cl.
*H04R 25/00* (2006.01)

(52) U.S. Cl.
USPC .............................. 381/389; 381/86; 381/386

(58) Field of Classification Search
USPC ................... 381/86, 87, 302, 332, 386, 389; 181/141, 150, 199; 296/146.7, 146.1; 49/502

See application file for complete search history.

(56) References Cited

U.S. PATENT DOCUMENTS

| | | | | |
|---|---|---|---|---|
| 4,905,860 A | * | 3/1990 | Kurihara et al. | 381/86 |
| 5,736,689 A | * | 4/1998 | Van Hout et al. | 181/141 |
| 7,313,247 B1 | * | 12/2007 | Tilli et al. | 381/389 |

* cited by examiner

*Primary Examiner* — Huyen D Le
(74) *Attorney, Agent, or Firm* — Cantor Colburn LLP

(57) ABSTRACT

A vehicle audio system comprises a loud-speaker, a door assembly including a rigid inner panel and an outer panel joined to the inner panel along a front edge, a rear edge, and a bottom edge. A speaker support defined by a highly rigid panel is configured to receive and support the loud speaker in a speaker mounting opening. The speaker support comprises three sides having mounting points located at each corner such that the speaker support and loud speaker supported thereby, contacts the door assembly at a rigid front edge portion, a rigid bottom edge portion and a front corner defined by the intersection of the two.

14 Claims, 4 Drawing Sheets

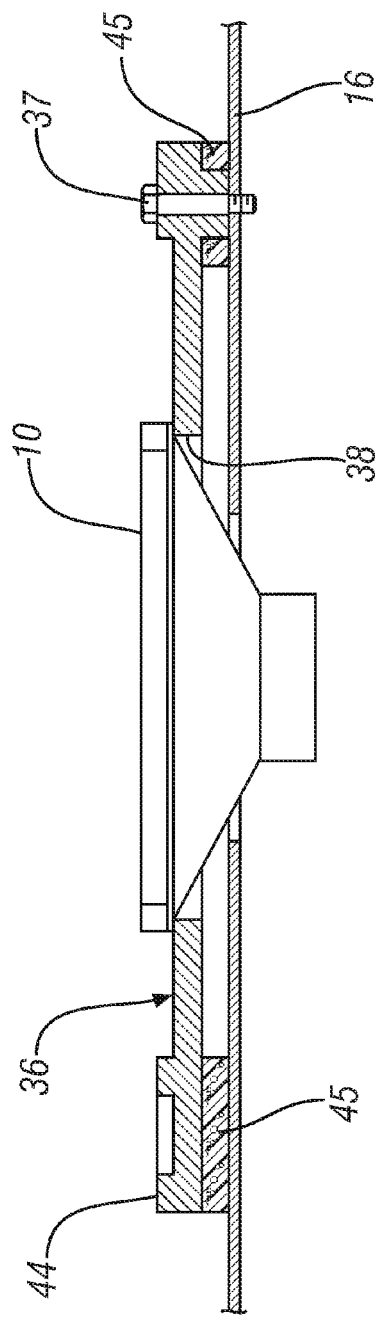
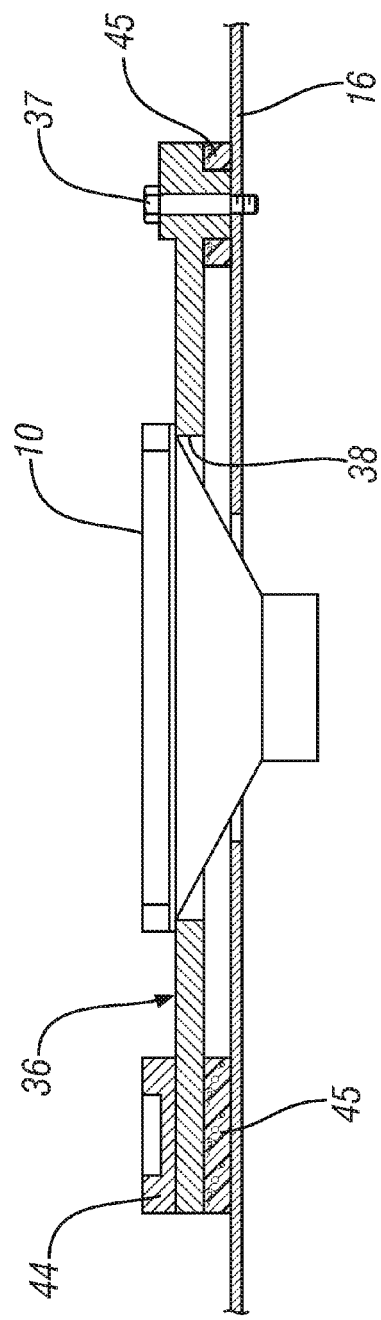

VEHICLE AUDIO SYSTEM HAVING DOOR MOUNTED SPEAKER SUPPORT

CROSS-REFERENCES TO RELATED APPLICATIONS

This patent application claims priority to U.S. Provisional Patent Application Ser. No. 61/369,305 filed Jul. 30, 2010, which is incorporated herein by reference in its entirety.

FIELD OF THE INVENTION

Exemplary embodiments of the present invention relate to door mounted speakers for automotive applications and, more particularly, to an integral speaker support to improve the acoustic performance of the speaker and reduce undesirable noise caused by excitation of various vehicle panels.

BACKGROUND

Typical automotive speaker systems include door mounted speakers that are often mounted in the lower front portion of the door for satisfactory acoustic performance. A common method of mounting the speakers is to form mounting openings in the frame or basket that supports the diaphragm and fasten the assembly to the inner door panel using screws or other suitable fasteners, FIG. 4A. The resulting speaker and audio system performance is influenced by, and dependent upon the stiffness of the vehicle interface. In most cases the acoustic performance of the speaker is improved as the stiffness of the mounting interface is increased however, often the vehicle interface lacks sufficient stiffness which degrades speaker performance. Specifically, low-frequency (bass) output and maximum sound pressure level are decreased, having an overall negative impact on vehicle level audio system performance. In addition, the speaker can induce mechanically coupled energy "E" to the door system through structurally less rigid, or more flexible areas of the door panel resulting in speaker induced vibration of the door inner panel and other components which mount thereto (ex. window lift system, door trim, rain paper, locks systems, etc.).

Several design features have been used to improve the stiffness of the vehicle-speaker interface including forming rolled edges or flanges around the speaker mounting holes, adding formations around the speaker interface, and increasing the mounting panel thickness however the improvement is typically small. The structural improvement is typically limited to the physical forming capability of the area in which the speaker is mounted and areas closely adjacent thereto.

SUMMARY OF THE INVENTION

In an exemplary embodiment, a vehicle audio system comprises a loud-speaker, a door assembly including a rigid inner panel and an outer panel joined to the inner panel along a front edge, a rear edge, and a bottom edge. A speaker support defined by a rigid panel is configured to support the loud speaker in a speaker mounting opening. The speaker support comprises three sides having mounting points located at each corner such that the speaker support and loud speaker supported thereby, contacts the door assembly at a rigid front edge portion, a rigid bottom edge portion and a front corner portion defined by the intersection of the two.

In another exemplary embodiment, a loudspeaker mounting system for mounting a loudspeaker in a vehicle door having a rigid inner panel and an outer panel joined to the inner panel along a front edge, a rear edge, and a bottom edge comprises a loud-speaker. A speaker support defined by a highly rigid panel is configured to support the loud speaker. The speaker support has three sides and mounting points located at each corner of the speaker support wherein the speaker support, and loud speaker supported thereby, contact the door assembly at a rigid front edge portion, a rigid bottom edge portion and a front corner portion defined by the intersection of the two.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which:

FIG. 3A is a cross section of a speaker support and brace member taken at Section 3-3 of FIG. 1;

FIG. 3B is a cross section of another embodiment of a speaker support and brace member taken at Section 3-3 of FIG. 1;

DESCRIPTION OF THE EMBODIMENTS

Figure 1:
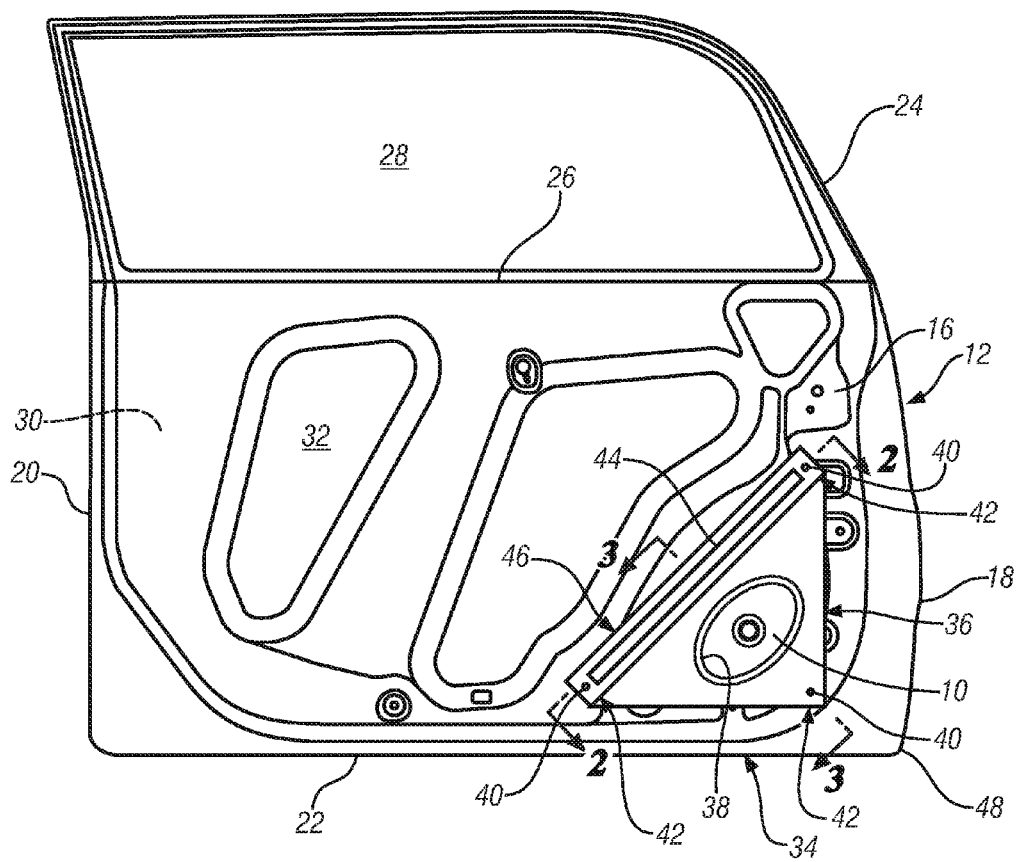
FIG. 1 is a schematic view of a vehicle door and speaker mounting system embodying features of the invention.

The following description is merely exemplary in nature and is not intended to limit the present disclosure, its application or uses. It should be understood that throughout the drawings, corresponding reference numerals indicate like or corresponding parts and features.

Referring now to FIG. 1, an exemplary embodiment of the invention is directed to a vehicle audio system comprising a plurality of loudspeakers 10 mounted in a door assembly 12 of a vehicle (not shown). The door assembly 12 typically includes a rigid inner panel 16 that is used to support the decorative interior panel (not shown) that interfaces with the vehicle occupant(s). An outer panel 30 is fixed to the inner panel 16 and forms the outer skin of the door assembly 12. The door assembly comprises a rigid front edge portion 18 a rigid rear edge portion 20 and a rigid bottom edge portion 22. A window frame 24 extends from the upper edge 26 of the rigid inner panel 16 and defines a window opening 28. It is at the front, rear and bottom edge portions 18, 20 and 22 respectively that rigid inner panel and the outer panel 30 are joined by mechanically working the edges, welding the edges or other suitable method for joining the inner and outer panels 16, 30, respectively. When joined the panels 16, 30 define an inner door cavity 32 that is configured to receive a window regulator (not shown) as well as one or more door mounted loud speakers 10.

In the exemplary embodiment of FIG. 1, the loud speaker 10 is mounted in the lower front portion 34 of the inner door cavity 32. While the lower front portion 34 of the inner door cavity 32 provides superior sound, it also is quite rigid because the lower bottom edge portion 22 and the front edge portion 18 are stiffer than other regions of the door assembly 12 due to the deep draws in the inner and outer panels 16, 30 respectively, that are typical of door panel designs as well as the stiffness and rigidity provided by the seams at which the inner door panel 16 is joined to the outer door panel 30. Referring again to FIG. 1, 5A and 5B, a speaker support 36 comprises a rigid panel that is configured to receive and support the loud speaker 10 in a speaker mounting opening 38 therein. In another embodiment the speaker support 36 may be constructed integrally with the speaker frame or basket 11, FIG. 4B. The speaker support 36 is preferably constructed of a highly rigid material such as sheet steel, aluminum plate, composite or other suitable, rigid material. In an exemplary embodiment, the speaker support is three-sided so as not to interfere with the operation of the window regulator (not shown) when it is installed in the inner door cavity 32. Significantly, the three-sided configuration of the speaker support 36 allows it to have three mounting points 40, with a mounting point located at each corner 42 such that the speaker support 36, and loud speaker 10 supported thereby, are limited in their contact with the door assembly 12 to the rigid front edge portion 18 the rigid bottom edge portion 22 and the corner portion 48 defined by the intersection of the two. With the exception of the mounting points 40, the speaker support 36 is free standing with respect to the inner panel 16 and the outer panel 30 of the door assembly 12 thereby decoupling and isolating the loud speaker 10 from less rigid structural areas of the door assembly 12 and avoiding acoustic excitement of the door panels as a result.

Figure 2:
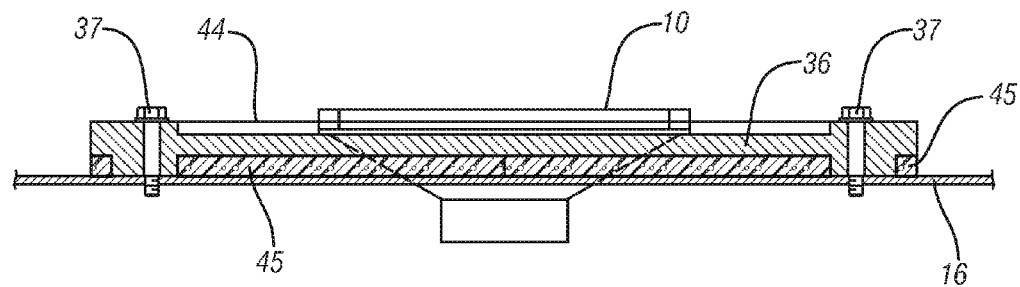
FIG. 2 is a cross section of a speaker support and brace member taken at Section 2-2 of FIG. 1.
Figure 4A:
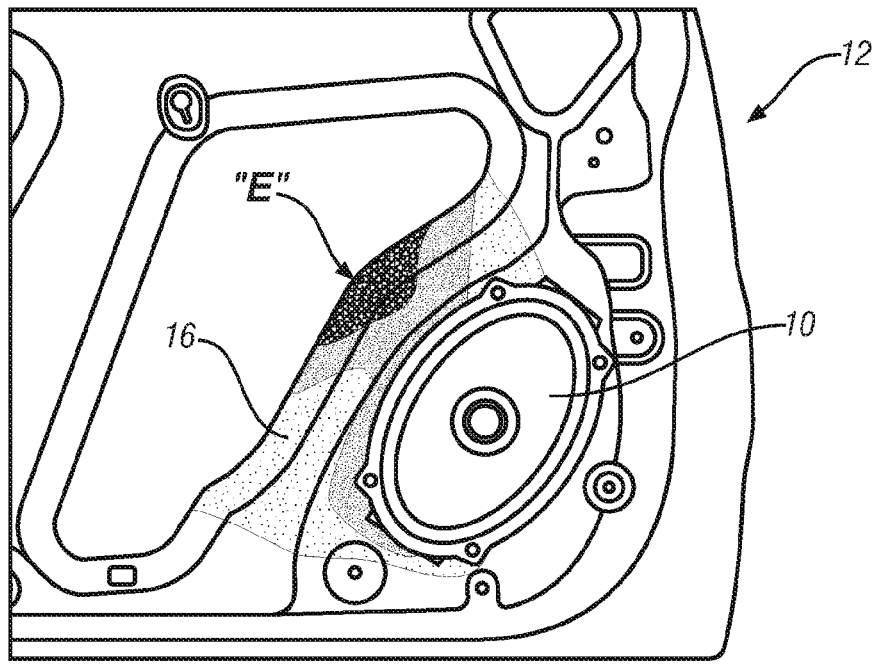
FIG. 4A is a partial view of a vehicle door assembly illustrating a prior art speaker installation illustrating the excitation of the door assembly at low frequencies.
Figure 4B:
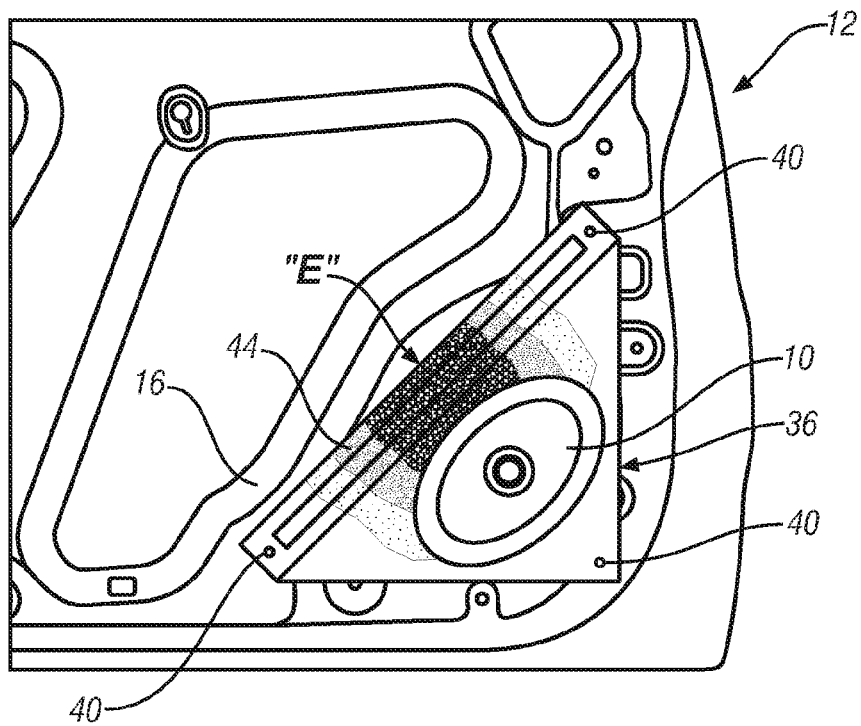
FIG. 4B is a partial view of a vehicle door assembly embodying features of the present invention and illustrating the excitation of the speaker support at low frequencies.
Figure 5A:
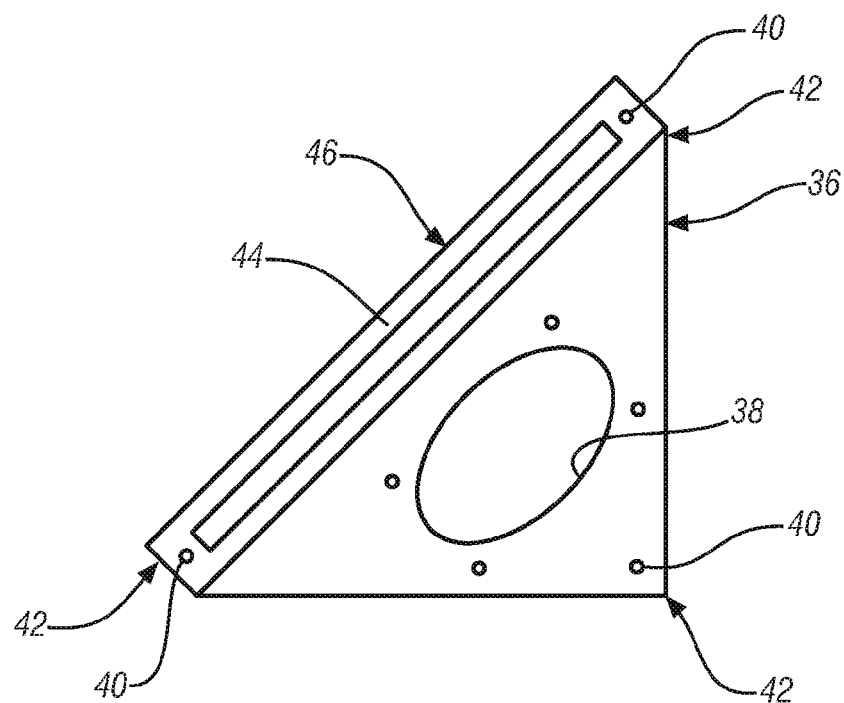
FIGS. 5A and 5B are views of a speaker support embodying features of the present invention.
Figure 5B:
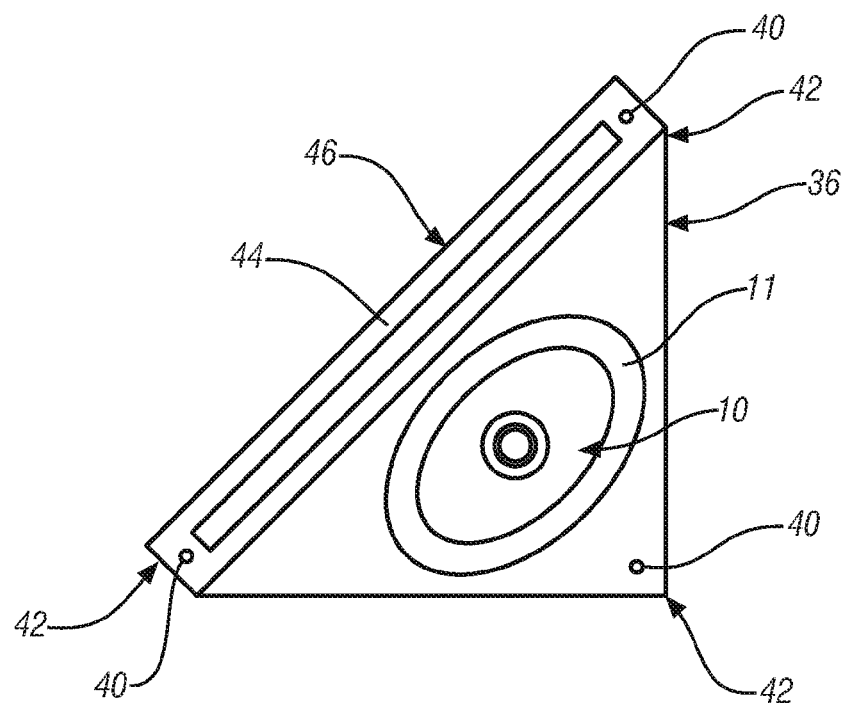

In an exemplary embodiment shown in the Figures, the speaker support 36 may include a brace member 44 that extends along the rear edge 46 thereof. In an exemplary embodiment illustrated in FIGS. 2 and 3A, the brace member may be constructed integrally with the speaker support 36 or, in an alternative embodiment illustrated in FIG. 3B, the brace member 44 may be configured as a separate piece that is fastened to the speaker support 36 using fasteners such as the bolts 37 used to retain the speaker support at the mounting points 40, or other suitable means for fastening the member 44. The brace member 44 provides additional stiffness to the speaker support 36 and further enables all of the mounting points 40 to be located at areas of the door assembly (ex. front edge portion 18, bottom edge portion 22) having the greatest structure and stiffness. A foam insert 45 may be disposed between the brace member 44 and the speaker support 36 and functions to damp vibration of the assembly as well as to seal the space between the brace member 44 and the speaker support 36 against the ingress of water and other contaminants. As a result, the use of the speaker support 36 results in increased speaker output and acoustic performance and low vibrational input from the loud-speaker 10 to the rest of the door structure. As illustrated in FIG. 4B, when excited by the speaker 10 frequencies, the brace member 44 carries the stress energy "E" along the rear edge 46 of the speaker support 36. In this manner, an attaching point along the rear edge 46 of the bracket 36 is not required for adequate support of the loud speaker 10 and excitement of the inner door panel 16, FIG. 4A, is avoided.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention, without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A vehicle audio system comprising:
    a loud-speaker;
    a door assembly including an inner panel, and an outer panel joined to the inner panel along a rigid front edge portion, a rigid rear edge portion, and a rigid bottom edge portion; and
    a speaker support defined by a rigid panel that is configured to receive and support the loud speaker in a speaker mounting opening, the speaker support having three sides having mounting points located at each corner such that the speaker support, and loud speaker supported thereby, contact the door assembly at the rigid front edge portion, the rigid bottom edge portion and a front corner portion defined by the intersection of the two.

2. The vehicle audio system of claim 1, wherein the speaker support is free standing relative to the rigid inner panel and the outer panel of the door assembly to decouple and isolate the loud speaker from less structural areas of the door assembly and avoid acoustic excitement of the door assembly.

3. The vehicle audio system of claim 1, further comprising a brace member extending along a rear edge of the speaker support to provide additional stiffness thereto and enabling the mounting points to be located in the door assembly along the rigid front edge portion, the rigid bottom edge portion and the front corner portion defined by the intersection of the two.

4. The vehicle audio system of claim 3, wherein the brace member is constructed integrally with the speaker support.

5. The vehicle audio system of claim 3, wherein the brace member is configured as a separate piece that is fastened to the speaker support.

6. The vehicle audio system of claim 3 further comprising a foam insert disposed between the brace member and the speaker support to damp vibration of the assembly and to seal the speaker support against the ingress of water and other contaminants.

7. The vehicle audio system of claim 1 wherein the speaker support may be constructed of a rigid material comprising at least one of sheet steel, aluminum plate, and composite.

8. The vehicle audio system of claim 1 wherein the speaker support is constructed integrally with the speaker frame or basket.

9. A loudspeaker mounting system, for mounting a loudspeaker in a vehicle door having a rigid inner panel and an outer panel joined to the inner panel along a rigid front edge portion, a rigid rear edge portion, and a rigid bottom edge portion, comprising;
    a loud-speaker;
    a speaker support defined by a rigid panel that is configured to receive and support the loud speaker, the speaker support having three sides;
    mounting points located at each corner of the speaker support wherein the speaker support, and loud speaker supported thereby, contact a door assembly at the rigid front edge portion, the rigid bottom edge portion and a front corner portion defined by the intersection of the two;
    a brace member extending along a rear edge of the speaker support to provide additional stiffness thereto and enabling the mounting points to be located in the door assembly along the rigid front edge portion, the rigid bottom edge portion and front corner portion defined by the intersection of the two and a foam insert disposed between the brace member and the speaker support to damp vibration of the assembly and to seal the speaker support against the ingress of water and other contaminants.

10. The loudspeaker mounting system of claim 9, wherein the speaker support is free standing relative to the rigid inner panel and the outer panel of the door assembly to decouple and isolate the loud speaker from less structural areas of the door assembly and avoid acoustic excitement of the door assembly.

11. The loudspeaker mounting system of claim 9, wherein the brace member is constructed integrally with the speaker support.

12. The loudspeaker mounting system of claim 9, wherein the brace member is configured as a separate piece that is fastened to the speaker support.

13. The loudspeaker mounting system of claim 9, wherein the speaker support may be constructed of a rigid material comprising sheet steel, aluminum plate, and composite.

14. The loudspeaker mounting system of claim 9, wherein the speaker support is constructed integrally with the speaker frame or basket.

* * * * *